US012234927B2

(12) United States Patent
Mornacchi et al.

(10) Patent No.: US 12,234,927 B2
(45) Date of Patent: Feb. 25, 2025

(54) SEAL ASSEMBLY FOR A ROTARY VALVE

(71) Applicant: Microtecnica S.r.l., Turin (IT)

(72) Inventors: Andrea Mornacchi, Turin (IT); Elio Mantia, Turin (IT); Gianfranco Salvatoriello, Turin (IT)

(73) Assignee: MICROTECNICA S.R.L., Turin (IT)

( * ) Notice: Subject to any disclaimer, the term of this patent is extended or adjusted under 35 U.S.C. 154(b) by 16 days.

(21) Appl. No.: 18/153,058

(22) Filed: Jan. 11, 2023

(65) Prior Publication Data
US 2023/0220930 A1 Jul. 13, 2023

(30) Foreign Application Priority Data
Jan. 11, 2022 (EP) .................................... 22151061

(51) Int. Cl.
*F16K 41/04* (2006.01)
*F16J 9/06* (2006.01)
*F16K 1/226* (2006.01)

(52) U.S. Cl.
CPC .............. *F16K 41/046* (2013.01); *F16J 9/06* (2013.01); *F16K 1/2268* (2013.01)

(58) Field of Classification Search
CPC .... F16J 15/54; F16J 15/56; F16K 1/22; F16K 1/224; F16K 41/046
USPC ................................ 251/304, 305; 277/589
See application file for complete search history.

(56) References Cited

U.S. PATENT DOCUMENTS

| | | | | |
|---|---|---|---|---|
| 1,175,383 A * | 3/1916 | Shepard | ..................... | F16J 9/06 277/473 |
| 2,034,227 A * | 3/1936 | Colwell | ............... | F16J 15/3464 277/507 |
| 2,931,671 A * | 4/1960 | Beeley | ................... | F16L 21/035 285/341 |
| 3,068,054 A * | 12/1962 | Schmidt | ..................... | F16J 15/32 277/437 |
| 3,218,087 A | 11/1965 | Hallesy | | |
| 3,614,114 A | 10/1971 | Traub | | |
| 3,663,076 A * | 5/1972 | Valente | .................. | F16J 15/184 92/206 |
| 4,022,424 A * | 5/1977 | Davis | ..................... | F16K 1/2268 277/412 |
| 4,032,159 A * | 6/1977 | Zitting | ..................... | F16J 15/32 277/584 |

(Continued)

FOREIGN PATENT DOCUMENTS

FR 2755490 A1 5/1998

OTHER PUBLICATIONS

Abstract of FR2755490 (A1), Published: May 7, 1998, 1 page.
European Search Report for Application No. 22151061.3, mailed Jun. 3, 2022, 8 pages.

*Primary Examiner* — Robert K Arundale
(74) *Attorney, Agent, or Firm* — CANTOR COLBURN LLP

(57) ABSTRACT

A seal assembly for a shaft is arranged to extend around an outer circumferential surface of the shaft and includes: a first seal ring having a first ring angled surface; a second seal ring having a second ring angled surface; and an elastic ring disposed between the first seal ring and the second seal ring and in contact with the angled surfaces. The elastic ring is arranged to act on the angled surfaces to bias the first seal ring and second seal ring radially inwardly and apart from one another. The seal assembly can be part of a rotary valve.

12 Claims, 4 Drawing Sheets

(56) References Cited

U.S. PATENT DOCUMENTS

| | | | |
|---|---|---|---|
| 4,252,331 A | | 2/1981 | Siegel |
| 4,394,023 A | | 7/1983 | Hinojosa |
| 4,681,327 A | * | 7/1987 | d'Agostino ............ F16J 15/164 |
| | | | 277/587 |
| 5,370,361 A | * | 12/1994 | Mendell .................... F16K 1/22 |
| | | | 251/307 |
| 9,360,128 B2 | | 6/2016 | Grabau |
| 9,863,552 B2 | | 1/2018 | Fan |
| 10,598,035 B2 | | 3/2020 | Snow et al. |
| 2009/0189358 A1 | | 7/2009 | Briscoe et al. |
| 2012/0104300 A1 | | 5/2012 | Dowd et al. |
| 2019/0093771 A1 | | 3/2019 | Jordan et al. |
| 2021/0010614 A1 | * | 1/2021 | Buckner ............... F16K 41/043 |

\* cited by examiner

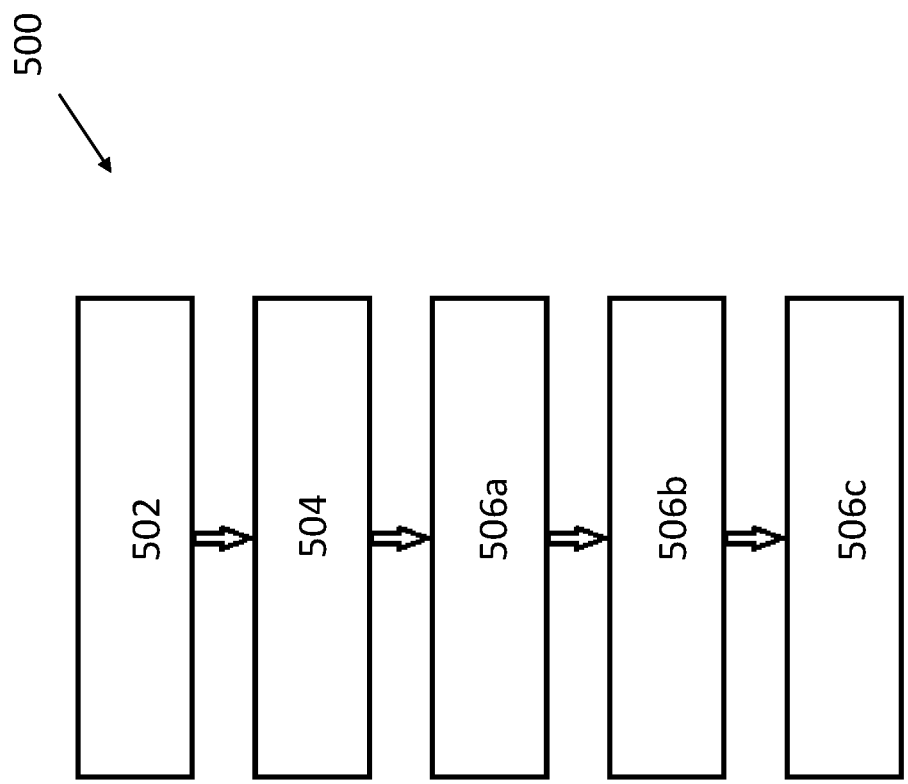

SEAL ASSEMBLY FOR A ROTARY VALVE

CROSS-REFERENCE TO RELATED APPLICATIONS

This application claims priority to European Patent Application No. 22151061.3 filed Jan. 11, 2022, the entire contents of which is incorporated herein by reference.

TECHNICAL FIELD

The present disclosure relates to a seal assembly for a rotating shaft, a rotary valve comprising a rotating shaft and the seal assembly, and a method of installing a rotary valve.

BACKGROUND

Rotary valves, such as butterfly valves, are known and include a valve disk which rotates or pivots within a flow channel to control the pressure and flow of fluid through the channel. The valve disk is rotated within the channel by a shaft connected to an actuator, which extends through the flow channel and the housing of the rotary valve. Rotary valves preferably require effective sealing around the shaft, particularly at the point where the shaft extends into the flow channel, such that fluid cannot leak out of the flow channel through the valve housing.

In the prior art (see FIG. 1, for example), a static seal (e.g. an O-ring) is positioned between the rotatable shaft and the housing. However, a static seal offers poor sealing performance when exposed to the high temperatures, pressures and friction experienced by such rotary valves.

Therefore there is a need in the art for improved sealing in rotary valves.

SUMMARY

According to a first aspect, there is provided a seal assembly for a shaft, wherein the seal assembly extends around an outer circumferential surface of the shaft and comprises: a first seal ring having a first ring angled surface; a second seal ring having a second ring angled surface; and an elastic ring disposed between the first seal ring and the second seal ring and in contact with the angled surfaces; wherein the elastic ring is arranged to act on the angled surfaces to bias the first seal ring and second seal ring radially inwardly and apart from one another.

By being arranged to act on the angled surfaces of the first seal ring and the second seal ring, the elastic ring biases the first seal ring and the second seal ring against the shaft (in the radially inward direction) to provide sealing around the shaft, and also biases the first seal ring and second seal ring apart from each other (in the axially direction) to provide sealing against parts of the housing of the rotary valve.

The elastic ring may be arranged so that pressure applied on a radially outward surface of the elastic ring increases the force biasing the first seal ring and second seal ring radially inwardly and apart from one another.

In the case where the fluid pressure experienced by the seal assembly exceeds the force(s) generated by the action of the elastic ring, fluid can leak past the first seal ring of the seal assembly and into a radial gap between the seal assembly and the valve housing. This increases the fluid pressure in the radial gap, i.e. the pressure experienced by the radially outward surface of the elastic ring and the radially outer surfaces of the first seal ring and second seal ring. Consequently, the increase in the force applied by the elastic ring to the first seal ring and second seal ring, in addition to the force applied to the radially outer surfaces of the first seal ring and second seal ring as a result of the pressure differential, leads to an enhanced increase in the sealing force of the seal assembly.

The elastic ring may comprise a first radially inner angled surface configured to contact the first ring angled surface and a second radially inner angled surface configured to contact the second ring angled surface.

An inner diameter of the first seal ring and an inner diameter of the second seal ring may each be smaller than an inner diameter of the elastic ring.

As the elastic ring is not in contact with the outer circumferential surface of the shaft, this may reduce the friction experienced by the shaft.

The first seal ring and second seal ring may each comprise graphite, and the elastic seal ring may comprise a high temperature superalloy.

Forming the seal ring of a soft material such as graphite reduces the friction and/or wear experienced by the shaft.

Each of the first seal ring, the second seal ring and the elastic seal ring may comprise a high temperature superalloy.

The high temperature superalloy may be an austenitic nickel-chromium-based superalloy.

The austenitic nickel-chromium-based superalloy may be Inconel 718.

The austenitic nickel-chromium-based superalloy may comprise: between 50.0% and 55.0% nickel, between 17.0% and 21.0% chromium, and between 2.8% and 3.3% molybdenum.

According to another aspect, there is provided a rotary valve comprising: a housing defining a fluid flow path; a valve disk disposed in the flow path, the disk arranged to block the flow path when the disk is in a first rotational position; a shaft extending through a bore in the housing and connected to the disk such that rotation of the shaft causes rotation of the disk within the flow path; and the seal assembly according to the preceding aspect, wherein the seal is located around the shaft and within the bore and is arranged to inhibit fluid flow from the flow path through the bore.

This design of rotary valve may reduce leakage of fluid from the flow path to external to the rotary valve compared to a design having solely a static ring-type seal located around the shaft within the bore, particularly at high pressures.

An annular shoulder may be formed in the housing around the bore, and the first seal ring may be arranged to load against the annular shoulder when the first seal ring and second seal ring are biased apart from one another.

The valve may comprise an annular bushing seat component fixed to the housing and located within the bore and around the shaft; and the second seal ring may be arranged to load against the bushing seat component when the first seal ring and second seal ring are biased apart from one another.

The valve may comprise an annular static seal located between the bushing seat component and the housing.

In use, the valve may be arranged such that fluid that leaks from the flow path into the bore increases the pressure acting on the radially outward surface of the elastic ring and the radially outward surfaces of the first seal ring and second seal ring, which in turn increases the force biasing the first seal ring and second seal ring radially inwardly and apart from one another.

In use, the fluid in the flow path may be a high pressure gas, for example, air.

According to another aspect, there is provided a method of making a rotary valve, the method comprising: providing a housing defining a fluid flow path and having a bore; providing a shaft in the bore and connecting the shaft to a valve disk disposed in the flow path; and installing a seal assembly according to the preceding aspect around the shaft and within the bore.

The step of installing the seal assembly may comprise: installing the first seal ring around the shaft and within the bore; installing the second seal ring around the shaft and within the bore; and installing the elastic ring between the first seal ring and the second seal ring and in contact with the angled surfaces.

The method may comprise: installing an annular bushing seat component within the bore and around the shaft; and fixing the annular bushing component to the housing; wherein the bushing seat component is in contact with second seal ring.

BRIEF DESCRIPTION OF DRAWINGS

Certain embodiments of the present disclosure will now be described in greater detail by way of example only and with reference to the accompanying drawings in which:

FIG. 4 shows a method of making a rotary valve.

DETAILED DESCRIPTION

Figure 1:
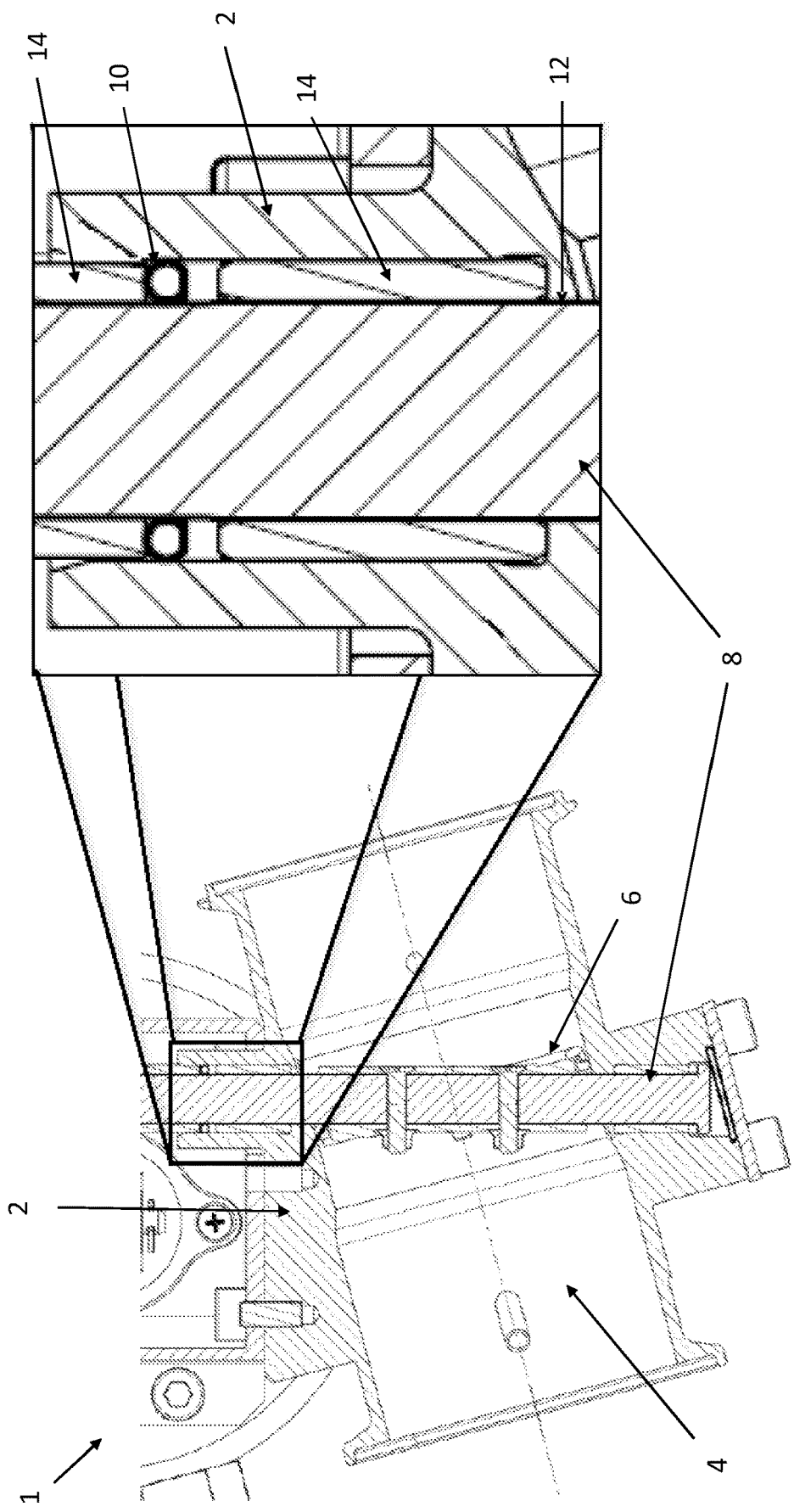
FIG. 1 shows a schematic cross-sectional view of a prior art rotary valve and seal assembly.

FIG. 1 shows a rotary valve 1 according to the prior art. The rotary valve 1 comprises a housing 2 which defines a fluid flow path 4. The fluid flow path 4 may be primarily used to convey high pressure gas (e.g. high pressure air), but may be used for any (high pressure) fluids. The rotary valve 1 comprises a valve disk 6 disposed in the fluid flow path 4 and arranged to control the pressure and the flow of fluid through the flow path 4. The valve disk 6 is connected to a shaft 8 such that rotation of the shaft 8 causes rotation of the valve disk 6 within the flow path 4. In a first rotational position (e.g. a 'closed' position), the valve disk 6 fully obstructs the flow path 4 to prevent the flow of fluid through the flow path 4. In a second rotational position (e.g. an 'open' position), the valve disk 6 does not obstruct, or at least only minimally obstructs, the flow of fluid through the flow path 4.

The valve housing 2 comprises a bore 12 formed therein and through which the shaft 8 extends. A static seal 10, such as an O-ring, is located around the shaft 8 and within the bore 12. Bushings 14 are provided in the bore 12 to aid the alignment of the shaft 8.

In use, the shaft 8 is rotated (for example, under the control of an actuator) in order to rotate the valve disk 6 within the flow path 4 and thus vary how much the valve disk 6 obstructs the flow path 4, in order to control the flow of the high pressure gas. However, because the shaft 8 is able to rotate relative to the valve housing 2, the high pressure gas is able to leak between the shaft 8 and the housing 2, to pass from the flow path 4 into the bore 12. The seal 10 can prevent this to a certain extent. However, wear that arises from friction with the shaft 8 can weaken the seal 10, particularly when the seal 10 is incorrectly positioned in the bore 12. Sealing performance is therefore not optimal and leakage from the bore 12 to external to the valve 1 often occurs.

Figure 2:
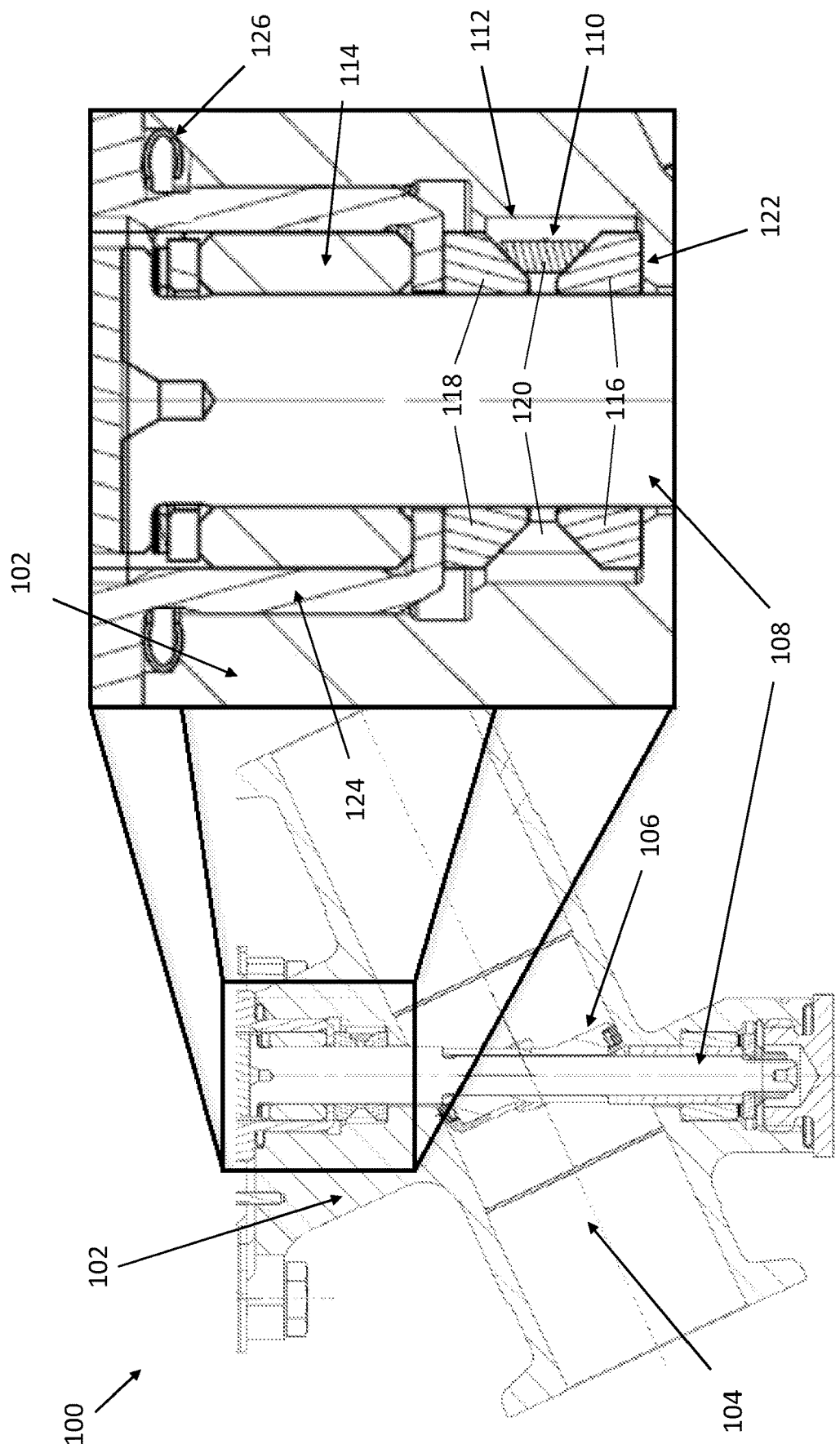
FIG. 2 shows a schematic cross-sectional view of a rotary valve and a seal assembly.

FIG. 2 shows a rotary valve 100 comprising a valve housing 102 which defines a fluid flow path 104. Similarly to the rotary valve 1 of FIG. 1, the rotary valve 100 comprises a valve disk 106 connected to a shaft 108 that are arranged to control the pressure and the flow of (high pressure) fluid through the flow path 4. The valve housing 102 comprises a bore 112 formed therein and through which the shaft 108 extends.

Figure 3:
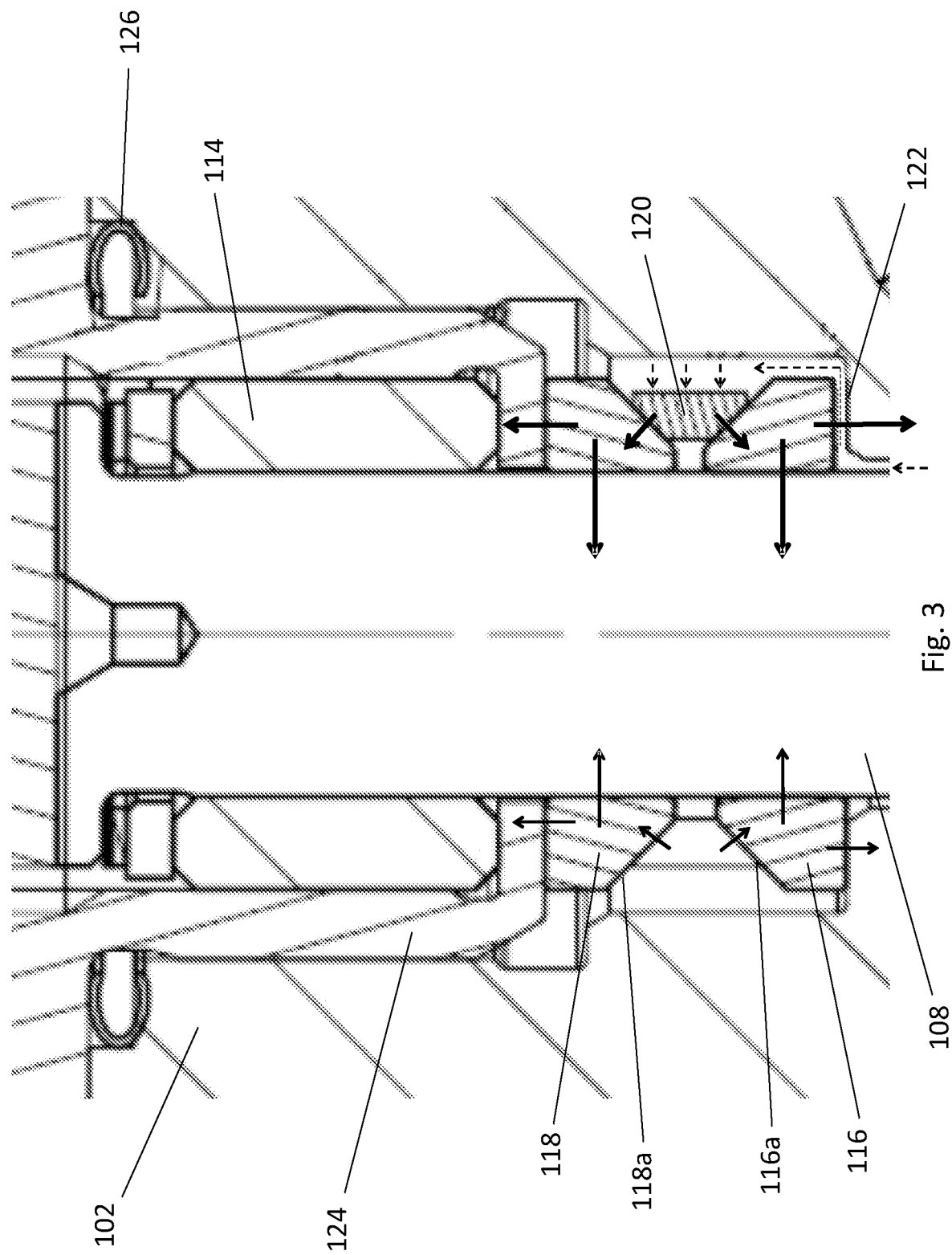
FIG. 3 shows a cross-sectional view of the seal assembly of FIG. 2 and the forces exerted by the seal assembly in use.

FIG. 3 shows an enlarged view of the region where the shaft 108 extends through the bore 112. In FIG. 3, a seal assembly 110 is positioned within the bore 112 and arranged to extend around the shaft 108 (the seal assembly 110 abuts against the outer circumferential surface of the shaft 108). The seal assembly 110 comprises a first seal ring 116, a second seal ring 118, and an elastic ring 120.

The first seal ring 116 comprises a first ring angled surface 116a, which is a radially outward surface of the first seal ring 116, radially outward from the shaft 108. The second seal ring 118 comprises a second ring angle surface 118a, which is a radially outward surface of the second seal ring 118, radially outward from the shaft 108. When the seal assembly 110 is arranged on the shaft 108, the first sealing ring 116 is spaced apart from the second sealing ring 118 and the first ring angled surface 116a and the second ring angled surface 118a face generally towards each other in the axial direction (i.e. along the axis of the shaft 108).

Preferably, the first ring angled surface 116a may be oriented at an angle that is the same as an angle of second ring angled surface 118a. However, the first ring angled surface 116a may be oriented at an angle different to an angle of the second ring angled surface 118a. For example, the first ring angled surface 116a may be oriented at an angle between 30 and 60 degrees from the radially inward surface of the first seal ring 116. For example, the second ring angled surface 118a may be oriented at an angle between 30 and 60 degrees from the radially inward surface of the second seal ring 118.

The elastic ring 120 is positioned in contact with the first ring angled surface 116a and the second ring angled surface 118a. In other words, the elastic ring 120 is disposed radially outwardly from and axially between the first seal ring 116 and the second seal ring 118.

The elastic ring 120, by virtue of its elastic properties, is configured to exert a radially inward force when it has been displaced (e.g. stretched) to a diameter greater than a rest diameter of the ring 120. As such, in the seal assembly 110, the elastic ring 120 is arranged to load against the angled surfaces 116a, 118a.

The elastic ring 120 may comprise a first radially inner angled surface configured to contact the first ring angled surface 116a and a second radially inner angled surface configured to contact the second ring angled surface 118a. An angle of the first radially inner angled surface may correspond to an angle of the first ring angled surface 116a. An angle of the second radially inner angled surface may correspond to an angle of the second ring angled surface 118a. The angle of the first radially inner angled surface may be different or the same as the angle of the second radially inner angled surface.

As can be seen in FIGS. 2 and 3, the first seal ring 116 and second seal ring 118 abut against the outer circumferential surface of the shaft 108, and the elastic ring 120 is spaced apart from the outer circumferential surface of the shaft 108. The elastic ring 120, as it is not in contact with the rotatable shaft 108, does not load against the shaft 108 and thus the angled surfaces 116a, 118a receive the full load of the elastic ring 120. Furthermore, because the elastic ring 120 does not load against the shaft 108, it can be made of harder materials that, if it were in contact with the rotatable shaft 108, would wear/damage the shaft 108.

The elastic ring 120 may be made from a high temperature superalloy, such as an austenitic nickel-chromium-based superalloy. One example material is Iconel 718, which is part of the family of metals manufactured by the Special Metals Corporation of New York state, USA. The first and second seal rings 116, 118 may be made from a soft material such as graphite (that will reduce wear on the shaft 108). Alternatively, the first and second seal rings 116, 118 can also be made from a high temperature superalloy (such as, for example Iconel 718). In this case, the shaft 108 and other parts of the valve 100 that are in contact with the first and second seal rings 116, 118 may be provided with a protective metal coating.

As a result of the angle of the first ring angled surface 116a and the angle of the second ring angled surface 118a, the force exerted by the elastic ring 120 both biases the first seal ring 116 and the second seal ring 118 radially inward (e.g. to seal the seal assembly 110 against the shaft 108) and also biases the first seal ring 116 and the second seal ring 118 apart from one another. By biasing the first seal ring 116 and the second seal ring 118 apart from one another in an axial direction, such a seal 110 is therefore particularly able to provide significantly improved sealing performance when it is provided around a shaft 108 in a bore 112 which has axial structures that the rings are arranged to load/brace against.

For example, as shown in FIG. 3, the bore 112 comprises an annular shoulder 122 formed in the housing 102. The first seal ring 116 is arranged to load against the annular shoulder when the first seal ring 116 and second seal ring 118 are biased apart from one another by the elastic ring 120.

Additionally, located in the bore 112 above the seal assembly 110, there is provided an annular bushing seat component 124. The annular bushing seat component 124 is fixed to the valve housing 102 and is configured to support a bushing 114 which is provided around shaft 108. The second seal ring 118 is arranged to load against the bushing seat component 124 when the first seal ring 116 and second seal ring 118 are biased apart from one another by the elastic ring 120.

As such, under the loading applied by the elastic ring 120, the first seal ring 116 effectively seals against the shaft 108 and the housing 102, and the second seal ring 118 effectively seals against the shaft 108 and the annular bushing seat component 124.

The rotary valve 100 may also comprise an annular static seal 126 (e.g. an O-ring) located between the bushing seat component 124 and the valve housing 102. As these components are fixed relative to each other, the static seal 126 is able to provide excellent sealing properties.

In use, the shaft 108 of the rotary valve 100 is rotated (for example, under the control of an actuator) in order to rotate the valve disk 106 and change how much the valve disk 106 obstructs the flow path 104, thus controlling the flow of the high pressure gas in the flow path 104.

Considering the seal assembly 110 under normal pressure conditions, the force applied by the elastic ring 120 against the first ring angled surface 116a seals the first seal ring against the shaft 108 and valve housing 102 and prevents the leakage of gas from the flow path 104 into the bore 112.

However, in the event that the pressure of the gas exceeds the sealing pressure generated by the seal assembly 110, then high pressure gas may be able to leak between the first seal ring 116 and the housing 102. The seal assembly 110 may be arranged to provide a sealing pressure between the first seal ring 116 and the housing 102 that is less than a sealing pressure between the first seal ring 116 and the shaft 108, so that in the event of a high pressure leak the gas passes between the first seal ring 116 and the housing 102 and not between the first seal ring 116 and the shaft 108. This may be done by adjusting the angle of the first ring angled surface 116a, for example.

Thus, where high pressure gas leaks between the first seal ring 116 and the housing 102 to pass from the flow path 104 into the bore 112, the pressure in the bore 112 radially outward of the seal assembly 110 increases. This increased pressure in the region radially outward from the seal assembly 110 produces a force that acts on the outer circumferential surface of the seal assembly 110, and particularly the outer circumferential surface of the elastic ring 120.

Accordingly, the force applied by the elastic ring 120 to the first ring angled surface 116a (and the second ring angled surface 118a) is increased by the increase in pressure in the region radially outward from the seal assembly 110. This increase in force allows the first seal ring 116 to be loaded back up against the housing 102 and reinstate the seal, preventing further leakage of gas from the flow path 104 into the bore 112.

Similarly, the increase in pressure also increases the sealing force between the second sealing ring 118 and the bushing seat component 124, preventing fluid in the region radially outward from the seal assembly 110 from leaking between these components.

The static seal 126, when working in conjunction with the seal assembly 120, is able to prevent gas from leaking between the bushing seat component 124 and the valve housing 102 from the bore 112 to the external environment of the valve 100.

FIG. 4 shows a flow chart of a method 500 of making a rotary valve.

At step 502, a housing is provided defining a fluid flow path and having a bore;

At step 504 a shaft is provided in the bore and connected the shaft to a valve disk disposed in the flow path.

The seal assembly 100 is then installed around the shaft and within the bore. This may involve step 506a of installing the first seal ring around the shaft and within the bore; step 506b of installing the second seal ring around the shaft and within the bore; and step 506c of installing the elastic ring between the first seal ring and the second seal ring and in contact with the angled surfaces.

The invention claimed is:

1. A rotary valve comprising:
a housing defining a fluid flow path;
a valve disk disposed in the flow path, the disk arranged to block the flow path when the disk is in a first rotational position;
a shaft extending through a bore in the housing and connected to the disk such that rotation of the shaft causes rotation of the disk within the flow path; and
a seal assembly located around an outer circumferential surface of the shaft and within the bore and is arranged to inhibit fluid flow from the flow path through the bore, wherein the seal assembly includes:
a first seal ring having a first ring angled surface;
a second seal ring having a second ring angled surface; and an elastic ring disposed between the first seal ring and the second seal ring and in contact with the angled surfaces;

wherein the elastic ring is arranged to act on the angled surfaces to bias the first seal ring and second seal ring radially inwardly and apart from one another;

wherein an annular shoulder is formed in the housing around the bore and wherein the first seal ring is arranged to load against the annular shoulder when the first seal ring and the second seal ring are biased apart from each other; and wherein the first ring angled surface has an angle that is selected such that the seal assembly applies a sealing pressure between first seal ring and the annular shoulder that is less than a sealing pressure between the first seal ring and the shaft so that, in use, fluid that leaks from the flow path into the bore passes between the first seal ring and the annular shoulder to increase the pressure acting on the radially outward surface of the elastic ring and radially outer surfaces of the first seal ring and the second seal ring which in turn increases the force biasing the first seal ring and second seal ring radially inwardly and apart from one another.

2. A valve according to claim 1, wherein the elastic ring is arranged so that pressure applied on a radially outward surface of the elastic ring increases the force biasing the first seal ring and second seal ring radially inwardly and apart from one another.

3. A valve according to claim 1, wherein the elastic ring comprises a first radially inner angled surface configured to contact the first ring angled surface and a second radially inner angled surface configured to contact the second ring angled surface.

4. A valve according to claim 1, wherein an inner diameter of the first seal ring and an inner diameter of the second seal ring are each smaller than an inner diameter of the elastic ring.

5. A valve according to claim 1, wherein the first seal ring and second seal ring each comprise graphite, and wherein the elastic seal ring comprises a high temperature superalloy.

6. A valve according to claim 5, wherein the high temperature superalloy is an austenitic nickel-chromium-based superalloy.

7. A valve according to claim 1, wherein the first seal ring, the second seal ring and the elastic seal ring each comprise a high temperature superalloy.

8. A valve according to claim 1, comprising an annular bushing seat component fixed to the housing and located within the bore and around the shaft; wherein the second seal ring is arranged to load against the bushing seat component when the first seal ring and second seal ring are biased apart from one another.

9. A valve according to claim 8, comprising an annular static seal located between the bushing seat component and the housing.

10. A valve according to claim 1 wherein, in use, the fluid in the flow path is a high pressure gas.

11. A method of making a rotary valve according to claim 1, the method comprising:

providing the housing defining the fluid flow path and having the bore;

providing the shaft in the bore and connecting the shaft to the valve disk disposed in the flow path; and installing the seal assembly around the shaft and within the bore.

12. A method according to claim 11, wherein installing the seal assembly comprises:

installing the first seal ring around the shaft and within the bore;

installing the second seal ring around the shaft and within the bore; and installing the elastic ring between the first seal ring and the second seal ring and in contact with the angled surfaces.

* * * * *